(12) United States Patent
Miller

(10) Patent No.: US 10,925,260 B2
(45) Date of Patent: Feb. 23, 2021

(54) BUCKLE FOR COLLAR AND LEASH

(71) Applicant: 8372683 Canada, Inc., Saint-Laurent (CA)

(72) Inventor: Lorne Miller, Mount Royal (CA)

(73) Assignee: 8372683 CANADA, INC., Saint-Laurent (CA)

( * ) Notice: Subject to any disclaimer, the term of this patent is extended or adjusted under 35 U.S.C. 154(b) by 175 days.

(21) Appl. No.: 15/978,619

(22) Filed: May 14, 2018

(65) Prior Publication Data

US 2019/0343086 A1    Nov. 14, 2019

(51) Int. Cl.
*A01K 27/00* (2006.01)

(52) U.S. Cl.
CPC .......... *A01K 27/005* (2013.01); *A01K 27/001* (2013.01); *A01K 27/003* (2013.01)

(58) Field of Classification Search
CPC .......... A01K 27/00; A01K 27/001–003; A01K 27/005
USPC ....... 119/792, 795, 797, 798, 856, 863, 865, 119/907
See application file for complete search history.

(56) References Cited

U.S. PATENT DOCUMENTS

| | | | | |
|---|---|---|---|---|
| 2,861,547 A | * | 11/1958 | Dale | A01K 27/003 119/797 |
| 2010/0031897 A1 | * | 2/2010 | Moeller | A01K 27/005 119/792 |
| 2010/0050956 A1 | * | 3/2010 | Pellei | A47D 13/086 119/770 |
| 2010/0251971 A1 | * | 10/2010 | Hsieh | A01K 27/005 119/798 |
| 2013/0213320 A1 | * | 8/2013 | Lambert | A01K 27/001 119/792 |
| 2015/0090195 A1 | * | 4/2015 | Krupich | A01K 27/002 119/792 |
| 2015/0114311 A1 | * | 4/2015 | Lynch | A01K 27/002 119/792 |
| 2015/0335104 A1 | * | 11/2015 | Dickie | A44B 13/02 119/792 |
| 2016/0095299 A1 | * | 4/2016 | Leon | A01K 27/005 119/799 |

(Continued)

OTHER PUBLICATIONS

PetSafe Keep Safe Break-Away Dog Collar, https://www.chewy.com/petsafe-keep-safe-break-away-dog/dp/52231, 8 pages, downloaded from the Internet Feb. 15, 2018.

*Primary Examiner* — Richard T Price, Jr.
(74) *Attorney, Agent, or Firm* — Anglehart et al.

(57) ABSTRACT

Disclosed is a buckle for an animal collar and/or leash that is easy to open and close, but at the same time does not open without user intervention. Illustratively, the inventive apparatus comprises a buckle that includes a first clasp member and a second clasp member that form a clasp. Pressure is applied and maintained at the second clasp member to transition the clasp from a closed position to an open position, wherein the second clasp member rotates around a hinge. As the buckle is easy to open and close, the user can conveniently attach the collar or leash to the animal and remove the collar or leash from the animal when it is no longer needed, thus preventing irritation of the animal and build-up of dirt and/or odors. The single-handed operation allows the user to attach and remove the collar or leash efficiently and with minimal effort.

17 Claims, 4 Drawing Sheets

(56) References Cited

U.S. PATENT DOCUMENTS

2016/0165849 A1 6/2016 Lewis
2016/0309683 A1 10/2016 Summers

* cited by examiner

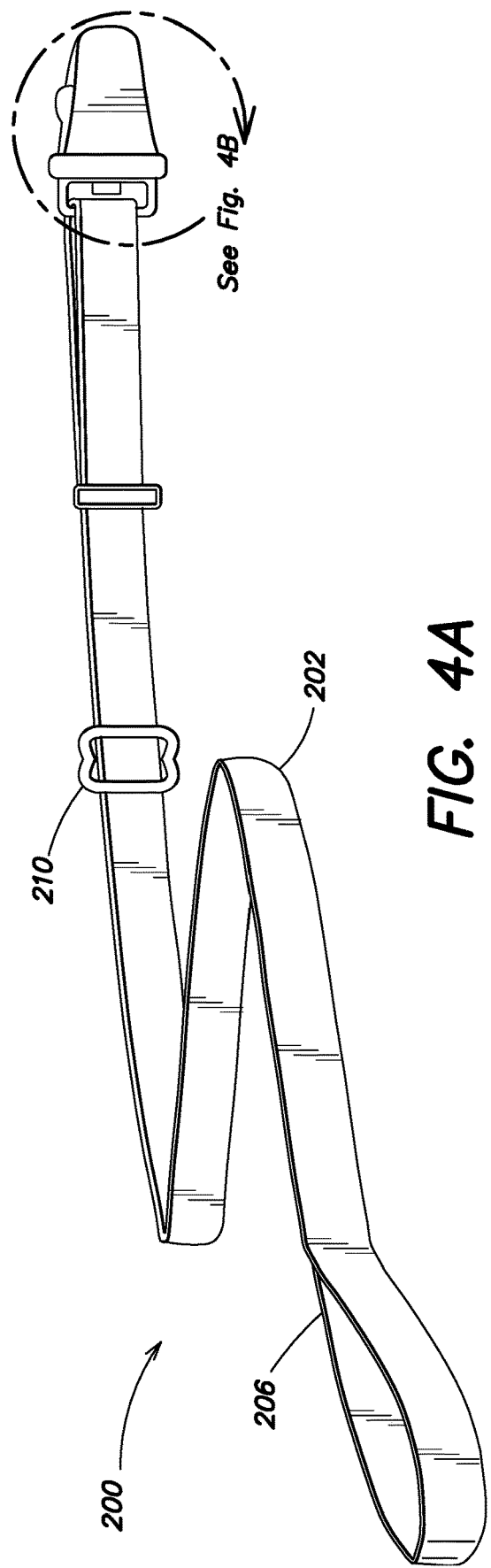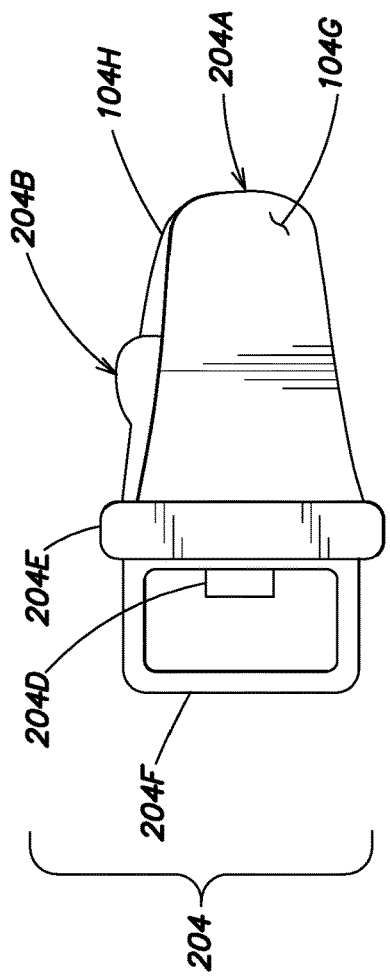
FIG. 4A
FIG. 4B

BUCKLE FOR COLLAR AND LEASH

BACKGROUND

Technical Field

This invention relates to animal collars and leashes, and more specifically to buckles for animal collars and leashes.

Background Information

Pets and other animals are required to be leashed at times. To properly leash an animal, a collar around the animal's neck is often used. A leash is then attached to the collar which provides a user control over the animal. Such collar usually comprises a buckle for attaching and releasing the collar. The user puts the collar around the animal's neck while the buckle is in an "open" position and then secures the collar around the animal's neck by transitioning the buckle to a "closed" position. Many existing collar buckles are overly cumbersome to open and close while putting the collar on the animal. A collar buckle that is difficult to operate makes it inconvenient for the user to attach and release the collar. A collar buckle that is difficult to operate also may result in the collar being left on the animal longer than necessary. A collar left on the animal may irritate the animal, and dirt and/or odors may build up in the collar material. Similarly, a leash could be attached to a D-ring or another device on the collar by a buckle. Many existing leash buckles are cumbersome to open and close. On the other hand, a buckle on the collar or leash that is too easy to open and close may also accidentally open without user intervention, inadvertently setting the animal free.

SUMMARY

The disadvantages of the prior art are overcome by providing a buckle for an animal collar and/or leash that is easy to open and close, but at the same time does not open without user intervention. Illustratively, the inventive apparatus comprises a buckle that includes a clasp that easily and efficiently transitions between an open position and a closed position. The clasp may include a first clasp member and a second clasp member that make contact with each other without user intervention when the clasp is in the closed position. The second clasp member may be rotatably coupled to a base of the buckle by a hinge. The hinge may further be spring-loaded to provide for single-handed operation. When the user exerts and maintains pressure on the second clasp member, the second clasp member acts as a lever and rotates on the hinge. This rotation creates an opening between the first clasp member and the second clasp member, thereby transitioning the clasp to the open position. When the user releases the pressure on the second clasp member, the spring-loaded hinge rotates the second clasp member back to its original position and contacting the first clasp member, thereby transitioning the clasp to the closed position.

An exemplary animal collar includes a collar strap, the buckle, fasteners, and a length adjustment device/mechanism. The collar strap may be manufactured from a natural material, a synthetic material, or a combination of natural and synthetic materials. The collar strap may also be manufactured from metal or may be a chain. It may have any suitable width, depending on the user's preferences and the type of animal it is being used with. The buckle is attached to the collar strap. The buckle's material, size, and tensile strength may be adapted to the preferences of the user and/or the size and strength of the animal that the collar is being used with. An exemplary buckle may have a tensile strength of 300-400 pounds. As the buckle is easy to open and close, the user can conveniently attach the collar to the animal and remove the collar from the animal when it is no longer needed, thus preventing irritation of the animal and build-up of dirt and/or odors. The single-handed operation allows the user to attach and remove the collar efficiently and with minimal effort.

An exemplary leash includes a leash strap, the buckle, a grip portion, and a length adjustment device/mechanism. The leash strap may be manufactured from a natural material such as cotton or leather, from a synthetic material such as nylon or vinyl, or from a combination of natural and synthetic materials. The leash strap may also be manufactured from metal or be a chain. The buckle is attached to the leash strap. The buckle's material, size, and/or tensile strength may be adapted to the preferences of the user and/or the size and strength of the animal that the leash is being used with. An exemplary buckle may have a tensile strength of 300-400 pounds. As the buckle is easy to open and close, the user can attach the leash to the animal's collar and detach the leash from the animal's collar using a single hand and minimal effort.

BRIEF DESCRIPTION OF THE DRAWINGS

The description below refers to the accompanying drawings, of which:

FIG. 4A depicts an illustrative animal leash with the buckle according to one or more embodiments described herein; and FIG. 4B depicts a detailed view of the buckle in FIG. 4A according to one or more embodiments described herein.

DETAILED DESCRIPTION OF AN ILLUSTRATIVE EMBODIMENT

Figure 1:
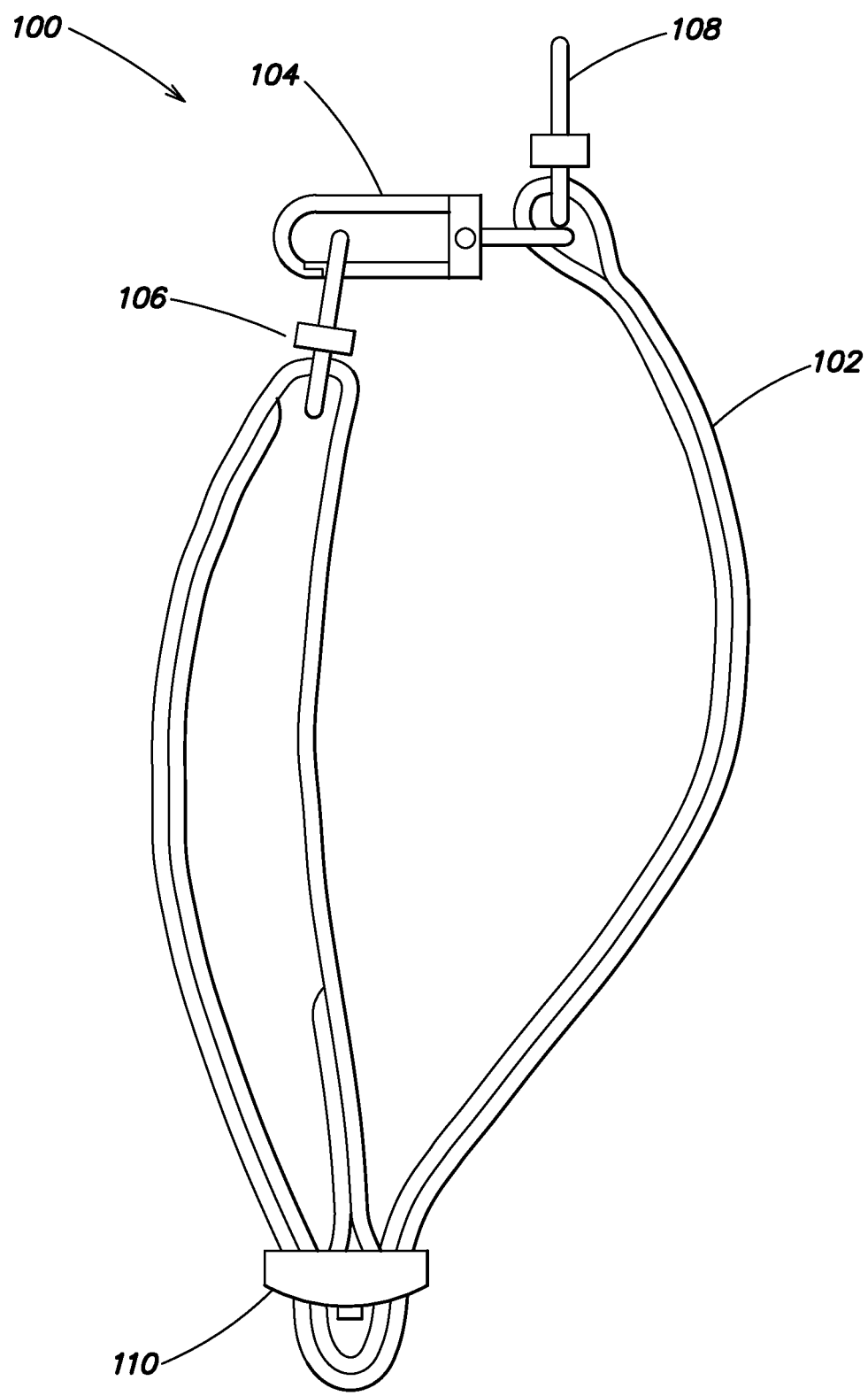
FIG. 1 depicts an illustrative animal collar with a buckle according to one or more embodiments described herein.

FIG. 1 depicts an illustrative animal collar 100 with buckle 104. The animal collar 100 includes a collar strap 102, the buckle 104, a first fastener 106, a second fastener 108, and a length adjustment device/mechanism 110. The exemplary collar strap 102 may be manufactured from a natural material such as cotton or leather, from a synthetic material such as nylon or vinyl, or from a combination of natural and synthetic materials. In addition, the collar strap 102 may be manufactured from a metal, it may be a chain, or it may be made from any other material as generally known to those skilled in the art, depending on the user's preferences and/or the type of animal that it is being used with. The collar strap 102 may also have any suitable width, depending on the user's preferences and/or the type of animal that it is being used with. The collar strap 102 is illustratively manufactured and looped or folded in a manner that allows the user to adjust its length using the length adjustment device/mechanism 110. Various ways to adjust the length of the collar strap 102 using the length adjustment device/mechanism 110 are known to those skilled in the art. It is expressly noted that collar strap 102 may not include the length adjustment device/mechanism. For example, the collar strap 102 may not include the length adjustment device/mechanism when the collar strap 102 it is made from metal or is a chain. The illustrative animal collar 100 further includes a buckle 104. The exemplary buckle 104 may include a D-ring at its base. In that case, the collar strap 102 may be looped through the D-ring of the buckle 104. In other embodiments, the buckle 104 may be attached to the collar strap 102 in any of various ways as known to those skilled in the art. The buckle 104 may be manufactured from metal or from another material. The material, size, and/or tensile strength of the buckle 104 may be adapted to the user's preferences and/or the size and strength of the animal that the collar is made to be used with. For example, the buckle 104 may have a tensile strength of 300-400 pounds.

The exemplary animal collar 100 further includes a first fastener 106. The first fastener 106 may be a single D-ring or it may be a double bar D-ring, or it may be any other kind of fastener. Illustratively, when the first fastener 106 is a double bar D-ring, the collar strap 102 is looped through one bar of the D-ring. The user can then use the other bar of the D-ring to attach the first fastener 106 to the buckle 104. However, the first fastener 106 may be attached to the collar strap 102 in any of various ways as known to those skilled in the art.

The exemplary animal collar 100 further includes a second fastener 108. The second fastener 108 may be a single D-ring or it may be a double bar D-ring, or it may be any other kind of fastener. Illustratively, when the second fastener 108 is a double bar D-ring, the collar strap 102 is looped through one bar of the D-ring. The user can then use the other bar of the D-ring to attach a leash (not shown) to the animal collar 100. It is noted that FIG. 1 shows the collar strap 102 looped through the second fastener 108 and the buckle 104 at the same location. However, the collar strap 102 may be looped through the second fastener 108 and the buckle 104 at different locations, or it may be looped only through the second fastener 108 or only through the buckle 104, or through neither the second fastener 108 nor the buckle 104.

Figure 2A:
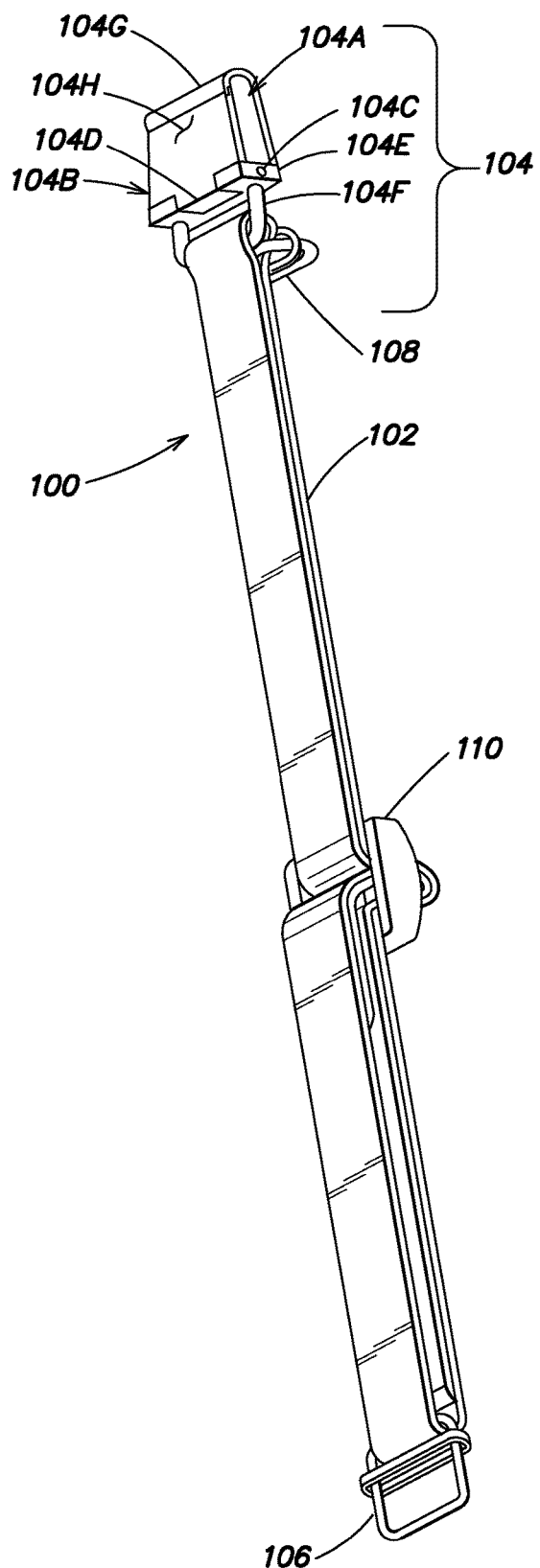
FIG. 2A depicts an illustrative animal collar with a detailed view of the buckle in FIG. 1 in a closed position according to one or more embodiments described herein.
Figure 2B:
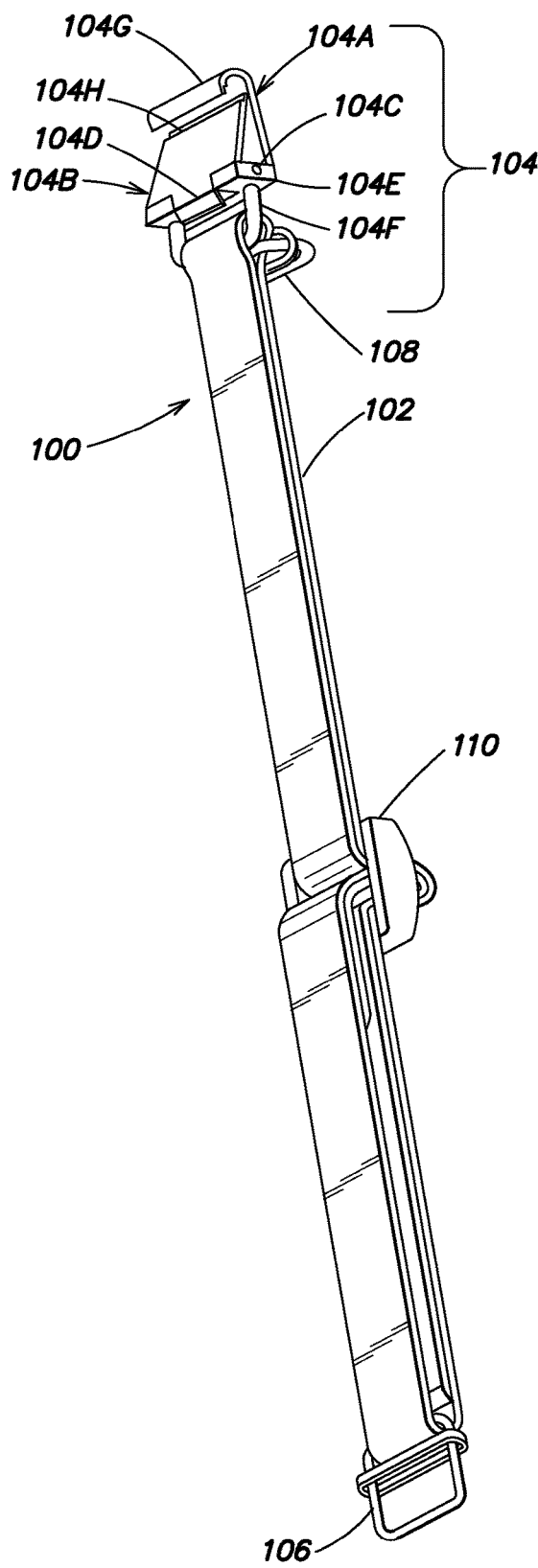
FIG. 2B depicts a detailed view of the buckle in FIG. 1 in an open position according to one or more embodiments described herein.

FIG. 2A shows another view of the illustrative animal collar 100 and a more detailed view of the buckle 104 in a closed position. The animal collar 100 includes the collar strap 102, the buckle 104 including components 104A-H, the first fastener 106, the second fastener 108, and the length adjustment device/mechanism 110. Specifically, the 104 includes a clasp formed by first clasp member 104A and second clasp member 104B. The first clasp member 104A is on the exterior of the collar furthest from the animal and the second clasp member 104B is on the interior of the collar closest to the animal. The first clasp member 104A may have a first end and a second end 104G. The second end 104G of the first clasp member 104A may be curved as depicted in FIGS. 2A and 2B, or may be any other shape. In addition, the second end 104G of the first clasp member 104A may be tapered and include a lip as depicted in FIGS. 2A and 2B. The shape of second end 104G is a hook and a flap. The first end of the first clasp member 104A may be attached to the buckle base 104E. For example, the first end of the first clasp member 104A may be welded, soldered, screwed or glued to the buckle base 104E, or the first clasp member 104A may be made from the same piece of material as the buckle base 104E. The buckle base 104E is coupled to the collar strap 102, for example by looping the collar strap 102 through the D-ring 104F of the buckle base 104E. The second clasp member 104B may also have a first end 104D and a second end 104H. The second end 104H of the second clasp member 104B may be straight as depicted in FIGS. 2A and 2B, or may be any other shape. The straight second clasp member 104B provides a flat surface of the buckle 104 resting smoothly against the neck of the animal so that the pressure on buckle 104 is evenly distributed across buckle 104. When one pulls on the other, stress reduced on flat/straight side. Buckle 104 is the same width as collar strap 102. In addition, the second end 104H of the second clasp member 104B may be tapered and include a lip as depicted in FIGS. 2A and 2B. The second end 104H has a lip. The second clasp member meets first clasp member flat on a step as to keep animal hair from interfering with the operation. The first end 104D of the second clasp member 104B may be to the buckle base 104E by way of a hinge. The hinge is formed by the first end 104D of the second clasp member 104B and hinge pin 104C. Accordingly, the second clasp member 104B may act as a lever. When the first or second clasp member pulls on the other, stress reduced on the other clasp member.

Illustratively and without user intervention, the second end 104G of the first clasp member 104A makes contact with the second end 104H of the second clasp member 104B such that the clasp is in the closed the respectively lips of second end 104G of the first clasp member 104A and the second end 104H of the second clasp member 104B fit together and overlap as depicted in FIG. 2A. More specifically, the lip of the first clasp member 104A is on the exterior of the clasp while the lip of the second clasp member 1048 is on the interior of the clasp when the lips overlap and the buckle 104 is in the closed position. The exterior of the collar is on the same side as the of the second fastener 108, the same side as first clasp member 104A and the interior of the collar is on the opposite side of second faster, the same side as a second clasp member 104B. When the lips overlap and the buckle 104 is in the closed position" as depicted in FIG. 2A. As such, the first clasp member 104A and second clasp member 104B are secure in the closed position as depicted in FIG. 2A and the clasp cannot be opened without user intervention. Further, because of the configuration of the two clasp members 104A and 104B, the user is allowed to easily open and close the buckle 104 for attachment and for example, a single hand.

When the user exerts and maintains pressure on the second clasp member 104B, lever action forces a rotation of the first end 104D of the second clasp member 104B around the hinge pin 104C. Specifically, the lip of the second end 104H of the second clasp member 104B disengages from the lip of the second end 104G of the first clasp member 104A to create an opening between the second end 104H of the second clasp member 104B and the second end 104G of the first clasp member 104A, thus transitioning the clasp from the closed position to the open position as depicted in FIG. 2B. Exemplarily, the user now can insert the first fastener 106 into the opening between the second end 104H of the second clasp member 104B and the second end 104G of the first clasp member 104A to close, for example, the collar around the neck of an animal. The hinge formed by the first end 104D of the second clasp member 104B and the hinge pin 104C may be spring-loaded so that the second end 104H of the second clasp member 104B moves back into its original position when the user releases the pressure, thus transitioning the clasp from the open position back to the closed position as depicted in FIG. 2A. Thereby, the inserted first fastener 106 is now secured to the buckle 104. Similarly, the user can remove the first fastener 106 from the buckle 104 to remove the collar 100 from around the neck of the animal by applying and maintaining pressure on the second clasp member 104B as described above.

Figure 3C:
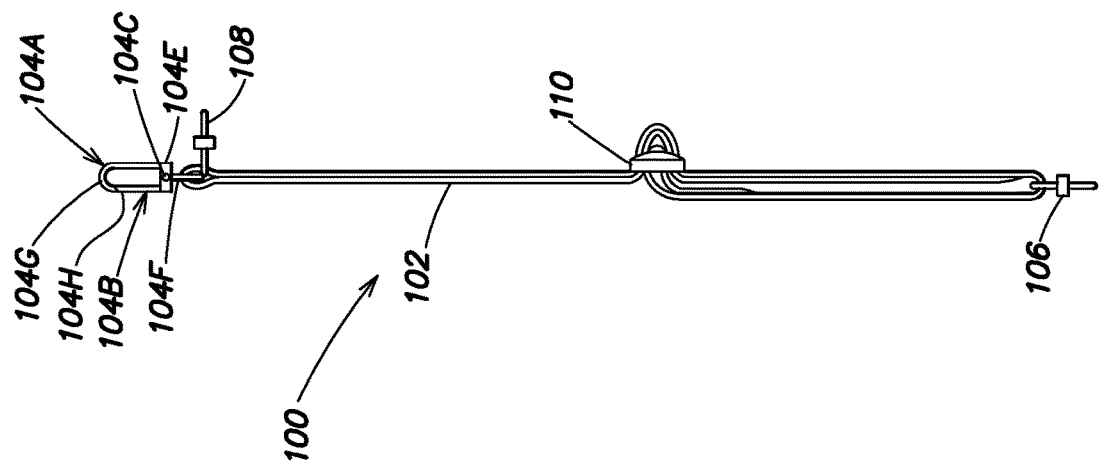
FIGS. 3A, 3B, and 3C depict an alternate view of the illustrative animal collar with is the buckle according to one or more embodiments described herein.
Figure 3B:
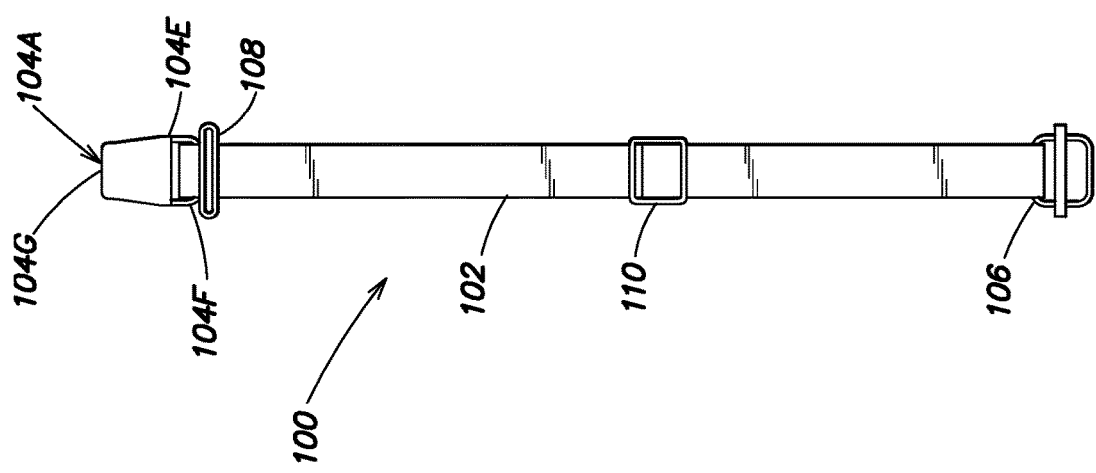
Figure 3A:
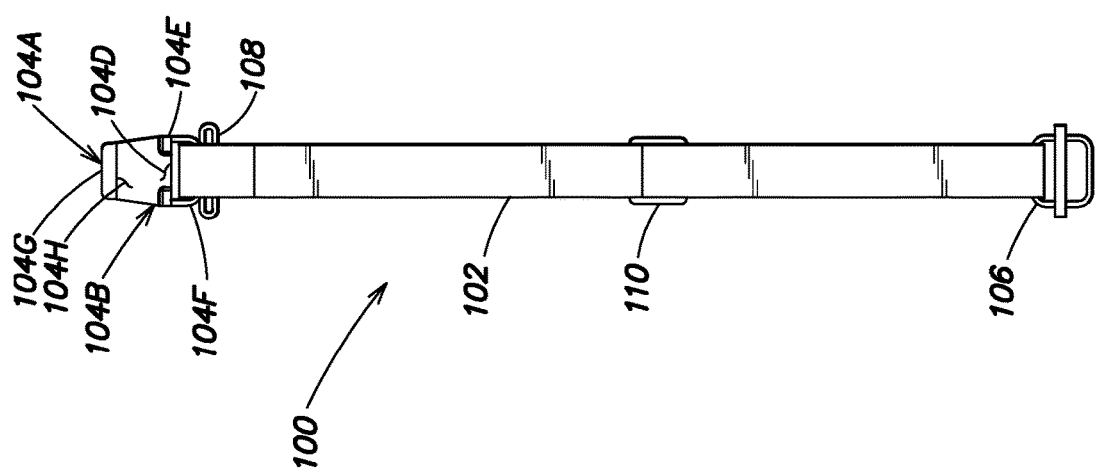

FIGS. 3A, 3B, and 3C depict alternative views of an illustrative collar with the buckle. Similar to FIG. 2A, the exemplary animal collar 100 includes the collar strap 102, the buckle 104 including components 104A-H, the first fastener 106, the second fastener 108, and the length adjustment device/mechanism 110. The buckle 104 includes a clasp formed by the first clasp member 104A and the second clasp member 104B. Illustratively, the first end of the first clasp member 104A is attached to the buckle base 104E. The first end 104D of the second clasp member 104B and the hinge pin 104C form a hinge. By way of the hinge, the first end 104D of the second clasp member 104B is rotatably coupled to the buckle base 104E. Advantageously and by way of the hinge formed by the first end 104D of the second clasp member 104B, the hinge pin 104C, and the buckle base 104E, the second clasp member 104B acts as a lever to transition between the closed position and the open position of the clasp. Illustratively, when the user exerts and maintains pressure on the second clasp member 104E, the space between the second end 104H of the second clasp member 104B and the second end 104G of the first clasp member 104A becomes greater to, transitioning the clasp to the open position. Thus, a user may, for example, insert and/or remove a portion of the collar from the buckle 104. For example, the user may insert and/or remove the first fastener 106 into/from the buckle 104. When the user releases the pressure, the space between the second end 104H of the second clasp member 104B and the second end 104G of the first clasp member 104A becomes smaller, transitioning the clasp formed by the first clasp member 104A and the second clasp member 104B to the closed position.

FIG. 4A depicts an illustrative leash with the buckle. Animal leash 200 includes a leash strap 202, the buckle 204 including components 204A-H, a grip portion 206, and a length adjustment device/mechanism 210. The exemplary leash strap 202 may be manufactured from a natural material such as cotton or leather, from a synthetic material such as nylon or vinyl, or from a combination of natural and synthetic materials. Alternatively, the leash strap 202 may be made from metal or may be a chain, or it may be made from any other material as known to those skilled in the art. Advantageously, the leash strap 202 is manufactured from a material having high tensile strength, depending on the user's preferences and/or the size and strength of the animal that the exemplary leash 200 is being used with. The leash strap 202 may also have any suitable width, depending on the user's preferences and/or the type of animal that the leash 200 is being used with. The leash strap 202 is illustratively folded and/or looped in a manner that allows the users to adjust its length using the length adjustment device/mechanism 210. Various ways to adjust the length of the leash strap 202 using the length adjustment device/mechanism 210 are known to those skilled in the art. It is expressly noted that leash strap 202 may not include the length adjustment device/mechanism. For example the leash strap 202 may not include the length adjustment device/mechanism when the leash strap 202 is made from metal or is a chain.

The leash 200 also includes the grip portion 206 that allows the user to hold the leash. The grip portion 206 may be a looped portion of the leash strap 202, or the grip portion 206 may be designed in any other of various ways as known to those skilled in the art. The illustrative leash 200 further includes the buckle 204 including components 204A-H as depicted in FIG. 4B. The exemplary buckle 204 may include a D-ring 204F at its buckle base 204E. In that case, the leash strap 202 may be looped through the D-ring 204F of the buckle 204. In other embodiments, the buckle 204 may be attached to the leash strap 202 in any of various ways as known to those skilled in the art. The buckle 204 may be manufactured from metal or from another material. The material, size, and/or tensile strength of the buckle 204 may be adapted to the user's preferences and/or the size and strength of the animal that the leash is made to be used with. For example, the buckle 204 may have a tensile strength of 300-400 pounds.

The exemplary buckle 204 includes a clasp formed by first clasp member 204A and second clasp member 204B. The first clasp member 204A may have a first end and a second end 104G. The first end of the first clasp member 204A may be attached to the buckle base 204E. For example, the first end of the first clasp member 204A may be welded, soldered, screwed or glued to the buckle base 204E, or the first clasp member 204A may be made from the same piece of material as the buckle base 204E. The buckle base 204E is coupled to the leash strap 202, for example by looping the leash strap 202 through the D-ring 204F of the buckle base 204E. The second end 104G of the first clasp member 104A may be curved or may be any other shape. In addition, the second end 104G of the first clasp member 104A may be tapered and include a lip.

The second clasp member 204B may also have a first end 204D and a second end 104H. The first end 204D of the second clasp member 204B may be rotatably coupled to the buckle base 204E by way of a hinge. The hinge is formed by the first end 204D of the second clasp member 204B and a hinge pin (not shown) similar to what is described above in reference to FIGS. 2A, 2B, 3A, 3B, and 3C. The second end 104H of the second clasp member 104B may be straight or may be any other shape. In addition, the second end 104H of the second clasp member 104B may be tapered and include a lip.

Accordingly, the second clasp member 204B may act as a lever. Illustratively and without user intervention, the second end 104G of the first clasp member 204A makes contact with the second end 104H of the second clasp member 204B such that the clasp is in the closed position. Specifically, the respectively lips of second end 104G of the first clasp member 104A and the second end 104H of the second clasp member 104B fit together and overlap. More specifically, the lip of the first clasp member 104A is on the exterior of the clasp while the lip of the second clasp member 104B is on the interior of the clasp when the lips overlap and the buckle 104 is in the closed position. As such, the first clasp member 104A and second clasp member 104B are secure in the closed position and the clasp cannot be opened without user intervention. Further, because of the configuration of the two clasp members 104A and 104B, the user is allowed to easily open and close the buckle 104 for attachment and removal utilizing, for example, a single hand.

When the user exerts and maintains pressure on the second clasp member 204B, lever action forces a rotation of the first end 204D of the second clasp member 204B around the hinge pin. Specifically, the lip of the second end 104H of the second clasp member 104B disengages from the lip of the second end 104G of the first clasp member 104A to create an opening between the second end 104H of the second clasp member 204B and the second end 104G of the first clasp member 204A, thus transitioning the clasp from the closed position to the open position.

Exemplarily, the user now can insert a fastener, for example of an animal collar, into the opening between the second end 104H of the second clasp member 204B and the second end 104G of the first clasp member 204A, for example to attach the leash 200 to the animal collar. The hinge formed by the first end 204D of the second clasp member 204B and the hinge pin may be spring-loaded so that the second end 104H of the second clasp member 204B moves back into its original position when the user releases the pressure, thus transitioning the clasp from the open position back to the closed position. Thereby, the inserted fastener is now secured to the buckle 204. Similarly, the user can remove the inserted fastener from the buckle 204, for example to remove the leash 200 from the animal collar by applying and maintaining pressure on the second clasp member 204B as described above.

The foregoing description has been directed to specific illustrative embodiments. However, it will be apparent that other variations and modifications may be made to the described embodiments, with the attainment of some or all of their advantages. Specifically, various configurations, sizes, and materials have been described. It is expressly noted that all such descriptions should be taken as exemplary only and not limiting the invention. Therefore, it is the object of the appended claims to cover all such variations and modifications as come within the true spirit and scope of the invention.

What is claimed is:

1. An animal collar comprising:
    a collar strap;
    a buckle including a base attached to the collar strap and having a width approximately the same as a width of the collar strap, a hinge, a first clasp member extending from an outer surface of the base to the other side and having a hooked end, and a second clasp member extending from an inner surface of the base to the other side and having a flat surface the width of the base at an end connected to the base through the hinge, wherein the first clasp member and the second clasp member form a clasp; and
    a first fastener attached to the collar strap and attachable to the clasp,
    a second fastener attached to the collar strap and extending to an outer side of the collar strap opposite to a side of said inner surface of the base for attaching to a leash,
    wherein the second clasp member is biased to be in line with said hooked end and, in use, the second clasp is configured to rest flat against the neck of the animal,
    wherein the first clasp member and the second clasp member make contact with each other when the clasp is in a closed position.

2. The animal collar of claim 1 wherein the clasp transitions from the closed position to an open position when pressure is applied to the second clasp member to rotate the clasp member around the hinge.

3. The animal collar of claim 2 wherein the clasp transitions from the open position to the closed position when pressure is released from the second clasp member.

4. The animal collar of claim 2 wherein the first fastener is configured to be inserted into a space between the first clasp member and the second clasp member when the clasp is in the open position.

5. The animal collar of claim 1 wherein the hinge is spring-loaded.

6. The animal collar of claim 1, further comprising a length adjustment device configured to lengthen and shorten the collar strap.

7. The animal collar of claim 1 wherein the collar strap is manufactured from one of a natural material, a synthetic material, and a combination of a natural and a synthetic material.

8. The animal collar of claim 1 wherein the collar strap is manufactured from metal.

9. The animal collar of claim 1 wherein the collar strap is a chain.

10. The animal collar of claim 1 wherein the second fastener comprises a D-loop having a curved end.

11. An animal collar comprising:
    a collar strap made of a flexible sheet material; and
    a buckle having a loop for connecting to the collar strap and a clasp, said buckle having a base, a hinge, a first clasp member having a hooked end, and a second clasp member, wherein the first and second clasp members are about as wide as the collar strap at the base and tapered away from the base;
    a first fastener attached to the collar strap and having a loop attachable to the first clasp member; and
    a second fastener attached to the collar strap and attachable to a leash;
    wherein the tapered ends of the first and second clasp members fit inside the loop of the first fastener while the ends of the first and second clasp members at the base are wider than the inside of the loop of the first fastener.

12. The animal collar of claim 11, wherein the clasp transitions from the closed position to an open position when pressure is applied to the second clasp member to rotate the clasp member around the hinge.

13. The animal collar of claim 12, wherein the clasp transitions from the open position to the closed position when pressure is released from the second clasp member.

14. The animal collar of claim 12, wherein the first fastener is configured to be inserted into a space between the first clasp member and the second clasp member when the clasp is in the open position.

15. The animal collar of claim 11, wherein the hinge is spring-loaded.

16. The animal collar of claim 11, further comprising a length adjustment device configured to lengthen and shorten the collar strap.

17. The animal collar of claim 11, wherein the collar strap is manufactured from a synthetic material.

* * * * *

UNITED STATES PATENT AND TRADEMARK OFFICE
CERTIFICATE OF CORRECTION

PATENT NO. : 10,925,260 B2  
APPLICATION NO. : 15/978619  
DATED : February 23, 2021  
INVENTOR(S) : Lorne Miller Page 1 of 1

It is certified that error appears in the above-identified patent and that said Letters Patent is hereby corrected as shown below:

In the Specification

1. In Column 2, Line 40, after "with" delete "is".

2. In Column 4, Line 35, after "as" before "of the" delete "the".

3. In Column 4, Line 39, delete "position"" and insert -- position --, therefor.

4. In Column 5, Line 24, delete "104E," and insert -- 104B, --, therefor.

In the Claims

5. In Column 7, Claim 2, Line 55, after "1" insert -- , --.

6. In Column 8, Claim 3, Line 1, after "2" insert -- , --.

7. In Column 8, Claim 4, Line 4, after "2" insert -- , --.

8. In Column 8, Claim 5, Line 8, after "1" insert -- , --.

9. In Column 8, Claim 7, Line 12, after "1" insert -- , --.

10. In Column 8, Claim 8, Line 16, after "1" insert -- , --.

11. In Column 8, Claim 9, Line 18, after "1" insert -- , --.

12. In Column 8, Claim 10, Line 20, after "1" insert -- , --.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*